UNITED STATES PATENT OFFICE.

JOHN MacKENZIE, OF MIDDLESBROUGH, ENGLAND.

MANUFACTURE OF SULFATE OF AMMONIA AND IN THE PURIFICATION OF COAL-GAS.

1,155,753. Specification of Letters Patent. Patented Oct. 5, 1915.

No Drawing. Application filed March 29, 1915. Serial No. 17,911.

*To all whom it may concern:*

Be it known that I, JOHN MACKENZIE, a subject of the King of Great Britain, residing at 312 Grosvenor Terrace, Linthorpe Road, Middlesbrough, Yorkshire, England, have invented new and useful Improvements in the Manufacture of Sulfate of Ammonia and in the Purification of Coal-Gas, of which the following is a specification.

My invention relates to a process for the manufacture of sulfate of ammonia direct from the sulfur and ammonia compounds which are contained in gases generated by the dry distillation of coal, the process also serving simultaneously for the purification of such gases.

It is well known that coal-gas contains sufficient sulfur to combine with the ammonia compounds also contained therein to form sulfate of ammonia and several methods have already been proposed for effecting this combination, such methods being based mainly upon the principle of passing the gas, freed from tar, over heated oxid of iron, the oxygen of which re-acts with the sulfur, contained in the gas as sulfureted hydrogen, or other sulfur compounds, and produces sulfurous anhydrid which combines with the ammonia in the gas. It has also been proposed to employ nitrates for washing out ammonia from coal gas and in a process for desulfurizing gas obtained by the distillation of shale or mineral oil, it has also been proposed to utilize oxids of nitrogen for freeing or oxidizing the sulfur in sulfureted hydrogen formed by hydrogen from an outside source combining with the sulfur in the gas, the freed or oxidized sulfur then combining with the ammonia in the gas to form ammonium sulfate which is then removed. It has further been proposed in a process for the recovery or utilization from coal gas of ammonia in the form of ammonium nitrate or nitrite to bring the gas, before or after purification, into contact with uncombined nitrogen oxids or oxyacids obtained by combustion with nitrogen and oxygen of gas which has already been freed from ammonia.

Now, my invention has for its object to effect an improvement upon the methods hitherto proposed for obtaining sulfate of ammonia from the gases generated by the dry distillation of coal and to this end my invention consists in subjecting the gases in a moist atmosphere to the action of a compound of nitrogen and by a compound of nitrogen I mean any compound of nitrogen, the base of which is nitric acid, obtained, for example, from sodium nitrate or by the fixation of atmospheric nitrogen, the said medium oxidizing the sulfur compounds in the gases to form sulfur trioxid which, with the moisture, forms sulfuric acid. This at once attacks the ammonia in the gases and forms sulfate of ammonia.

In a suitable way of carrying out my invention, I proceed as follows, that is to say, I pass the gas freed from tar containing the sulfur and ammonia compounds, together with a suitable quantity of nitrous acid or its equivalent in a moist atmosphere at about 200° F., into a suitable vessel in which all the sulfur compounds are oxidized as above described and sulfate of ammonia is formed.

If sodium nitrate be used as the source of the nitrogen compound, it is mixed with sulfuric acid and the nitric oxid driven off by steam. The sulfuric acid decomposes the sodium nitrate and the steam denitrates the mixture and the moisture referred to above is supplied by this means.

Any excess of the nitrogen compound can be absorbed at the termination of the process in sulfuric acid of say, 70 to 80 per cent. strength, after which it is of advantage to pass the gas through lime boxes or to wash it with sprays of milk of lime so as to remove not only all traces of nitrogen compounds but also the carbonic acid present. The nitrous acid can then be expelled from the sulfuric acid by denitration and again used in the process.

It is obvious that, as all the sulfur compounds are oxidized in the course of the process, the gas which previously contained them, and from which they have been eliminated, is simultaneously purified.

Claims:

1. A process for the manufacture of sulfate of ammonia direct from the sulfur and ammonia compounds, which are contained in gases generated by the dry distillation of coal, consisting in subjecting the gases in a moist atmosphere to the action of a compound of nitrogen the base of which is nitric acid, substantially as described.

2. A process for the manufacture of sulfate of ammonia direct from the sulfur and ammonia compounds which are contained in gases generated by the dry distillation of coal, consisting in subjecting the gases in a moist atmosphere to the action of a compound of nitrogen the base of which is nitric acid, wherein the gas, freed from tar together with the nitrogen compound, is passed in a moist atmosphere at about 200° F. into a vessel in which all the sulfur compounds are oxidized and sulfate of ammonia is formed.

3. A process for the manufacture of sulfate of ammonia direct from the sulfur and ammonia compounds which are contained in gases generated by the dry distillation of coal, consisting in subjecting the gases in a moist atmosphere to the action of a compound of nitrogen the base of which is nitric acid, and any excess of the nitrogen compound remaining at the end of the process is absorbed in sulfuric acid and is then expelled therefrom by denitration and again used in the process.

JOHN MacKENZIE.

Witnesses:
R. E. WETHEY,
FRED MORRISON.